(12) United States Patent
Dunko

(10) Patent No.: US 7,791,594 B2
(45) Date of Patent: Sep. 7, 2010

(54) ORIENTATION BASED MULTIPLE MODE MECHANICALLY VIBRATED TOUCH SCREEN DISPLAY

(75) Inventor: Gregory A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 993 days.

(21) Appl. No.: 11/468,426

(22) Filed: Aug. 30, 2006

(65) Prior Publication Data

US 2008/0059888 A1 Mar. 6, 2008

(51) Int. Cl.
*G06F 3/041* (2006.01)
(52) U.S. Cl. .................. 345/173; 345/169; 715/700
(58) Field of Classification Search ........... 345/173, 345/649, 169, 650, 156; 715/700
See application file for complete search history.

(56) References Cited

U.S. PATENT DOCUMENTS

| | | | | |
|---|---|---|---|---|
| 5,661,632 | A * | 8/1997 | Register | 361/679.3 |
| 6,597,384 | B1 * | 7/2003 | Harrison | 345/204 |
| 2002/0180767 | A1 * | 12/2002 | Northway et al. | 345/698 |
| 2003/0085870 | A1 * | 5/2003 | Hinckley | 345/156 |
| 2004/0157647 | A1 * | 8/2004 | Takahashi | 455/566 |
| 2004/0204130 | A1 * | 10/2004 | Khazaka et al. | 455/566 |
| 2004/0223004 | A1 * | 11/2004 | Lincke et al. | 345/649 |
| 2005/0068337 | A1 | 3/2005 | Duarte et al. | |
| 2005/0143124 | A1 * | 6/2005 | Kennedy et al. | 455/556.1 |
| 2006/0005156 | A1 * | 1/2006 | Korpipaa et al. | 717/100 |
| 2006/0197753 | A1 * | 9/2006 | Hotelling | 345/173 |
| 2007/0004451 | A1 * | 1/2007 | C. Anderson | 455/556.1 |
| 2007/0035527 | A1 * | 2/2007 | Cheon et al. | 345/173 |
| 2007/0075965 | A1 * | 4/2007 | Huppi et al. | 345/156 |

FOREIGN PATENT DOCUMENTS

| | | |
|---|---|---|
| JP | 2005010119 | 1/2005 |
| WO | 0123985 | 4/2001 |
| WO | 2005119404 | 12/2005 |

OTHER PUBLICATIONS

International Preliminary Report on Patentability, corresponding to International Patent Application No. PCT/US2007/063360, dated Aug. 22, 2008.
Sony Ericsson Mobile Communications AB, International Search Report, issued in corresponding International Patent Application No. PCT/US2007/063360, Sep. 28, 2007.
Sony Ericsson Mobile Communications AB, Written Opinion, issued in corresponding International Patent Application No. PCT/US2007/063360, Sep. 28, 2007.

* cited by examiner

*Primary Examiner*—Amare Mengistu
*Assistant Examiner*—Koosha Sharifi
(74) *Attorney, Agent, or Firm*—R. Brian Drozd; Moore & Van Allen PLLC

(57) ABSTRACT

A system and method is disclosed for reconfiguring the graphical user interface (GUI) of a mechanically vibrated touchscreen display associated with a portable mobile communications device that is operable in a variety of modes. The reconfiguration of the GUI is based on the orientation of the portable mobile communications device. An orientation sensing mechanism senses whether the portable mobile communications device is currently in a portrait or landscape orientation. An orientation sensing application accesses an orientation profile that associates each mode of operation with either a portrait or landscape orientation and determines which mode of operation is the default mode for the sensed orientation of the portable mobile communications device. The GUI of the mechanically vibrated touchscreen display is then reconfigured for the default mode of operation.

19 Claims, 9 Drawing Sheets

ORIENTATION BASED MULTIPLE MODE MECHANICALLY VIBRATED TOUCH SCREEN DISPLAY

BACKGROUND OF THE INVENTION

Portable mobile communications devices such as mobile phones are becoming more sophisticated and include many new features and capabilities. One such capability that is not yet in widespread use is the inclusion of a tactile interface for a touchscreen display.

Touchscreen displays are well known and provide the ability to receive input by directly 'touching' the display means with a finger or other item such as a pen stylus. One of the biggest drawbacks to touchscreen displays is the lack of tactile sensation when actuating a key or button represented on the display. Recent technological advancements can now provide tactile feedback for a touchscreen display such that the user actually feels the sensation of pressing a mechanical key or button when they are actually making contact with a flat touchscreen display. The tactile feedback provides a greater user experience as well as a truer sense that the input was indeed received by the device.

Portable mobile communications devices utilize processing hardware and software that can operate multiple applications in addition to making and receiving cellular telephone calls. Many portable mobile communications devices provide camera devices and applications, digital music players, web browsers, office type applications including e-mail, and gaming applications. Each of these applications utilizes a separate and distinct graphical user interface (GUI) that is designed to be naturally intuitive to the user.

It becomes a significant design challenge to provide multiple GUIs based on a single display and keypad configuration that is inherent to a portable mobile communications device. Tactile feedback touchscreen display means driven by software controlled operating modes can quickly reconfigure a portable mobile communications device display to represent multiple different modes or applications such as those presented above. This opens the door to eliminating most mechanical keys on a portable mobile communications device in favor of configurable tactile feedback touchscreen displays. This also allows for a larger surface area for the display means since most of the area previously reserved for mechanical keys can be eliminated.

Most portable mobile communications devices are rectangular in shape meaning their displays are also rectangular in shape. However, not all of the multiple modes/applications listed above will utilize the display in the same orientation. Some applications work better when presented in a portrait orientation (phone, music player) while others are more intuitive in a landscape orientation (game playing, browser) while some may work equally well in either orientation (camera) depending on a personal preference.

In addition, a mechanically vibrated touchscreen display can be configured to cover the back and even the sides of a portable mobile communications device. This would allow for user interface 'buttons' to be configured in areas that are not just the front face of the portable mobile communications device.

Integrating motion/orientation sensing technology with tactile feedback touchscreen displays allows the portable mobile communications device to automatically reconfigure itself for a different mode of operation without the user having to delve into the intricacies of the user interface to manipulate the functions.

BRIEF SUMMARY OF THE INVENTION

In one embodiment there is presented a method of reconfiguring the graphical user interface (GUI) of a mechanically vibrated touchscreen display associated with a portable mobile communications device that is operable in a variety of modes. The reconfiguration of the GUI is based on the orientation of the portable mobile communications device. An orientation sensing mechanism senses whether the portable mobile communications device is currently in a portrait or landscape orientation. An orientation sensing application accesses an orientation profile that associates each mode of operation with either a portrait or landscape orientation and determines which mode of operation is the default mode for the sensed orientation of the portable mobile communications device. The GUI of the mechanically vibrated touchscreen display is then reconfigured for the default mode of operation.

The user is prompted if the default mode is the desired mode of operation. The portable mobile communications device receives input indicative of a response to prompting whether the default mode is the desired mode of operation. If the received input indicative of a response to prompting the user is negative, the GUI of the mechanically vibrated touchscreen display is reconfigured for another mode of operation associated with the current orientation of the portable mobile communications device. This continues until the GUI on the mechanically vibrated touchscreen display for the desired mode of operation is presented.

The modes of operation can include, but are not limited to, phone mode, camera mode, game mode, music player mode, and web-browser mode. In addition, the orientation sensing mechanism can include, but is not limited to, an accelerometer or a gyroscopic device.

In another embodiment there is presented a system and method of reconfiguring the graphical user interface (GUI) of a mechanically vibrated touchscreen display associated with a portable mobile communications device that is operable in a variety of modes. An orientation sensing mechanism senses whether the portable mobile communications device is currently in a portrait or landscape orientation and accesses an orientation profile that associates each mode of operation with either a portrait or landscape orientation. A list of modes of operation associated with the sensed orientation of the portable mobile communications device is presented to the user. The user is prompted to select a mode of operation from the list. Input indicative of a selected mode of operation is received and the GUI of the mechanically vibrated touchscreen display is reconfigured for the selected mode of operation associated.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

A number of mobile devices are equipped with motion or orientation sensing capabilities in the form of accelerometers and/or gyroscopes. Typical reasons for their inclusion include support for gaming applications, enhanced menu navigation/selection, or sports/fitness applications (e.g. pedometer), etc. Another potential and novel use for an embedded motion sensor within a mobile device is to automatically determine the orientation of the portable mobile communications device. The two most common two-dimensional orientations assume a rectangular base shape and are termed portrait and landscape. Portrait orientation is longer vertically than horizontally while landscape orientation is longer horizontally than vertically. With this orientation knowledge the portable mobile communications device can change the mode to suit the most likely desired mode based on the current orientation.

Most portable mobile communications devices are rectangular in shape meaning their displays are also rectangular in shape. However, not all of the multiple modes/applications that can be executed by a portable mobile communications device will utilize the display in the same orientation. Some applications work better when presented in a portrait orientation (phone, music player) while others are more intuitive in a landscape orientation (game playing, browser) while some may work equally well in either orientation (camera) depending on a personal preference.

Figure 1:
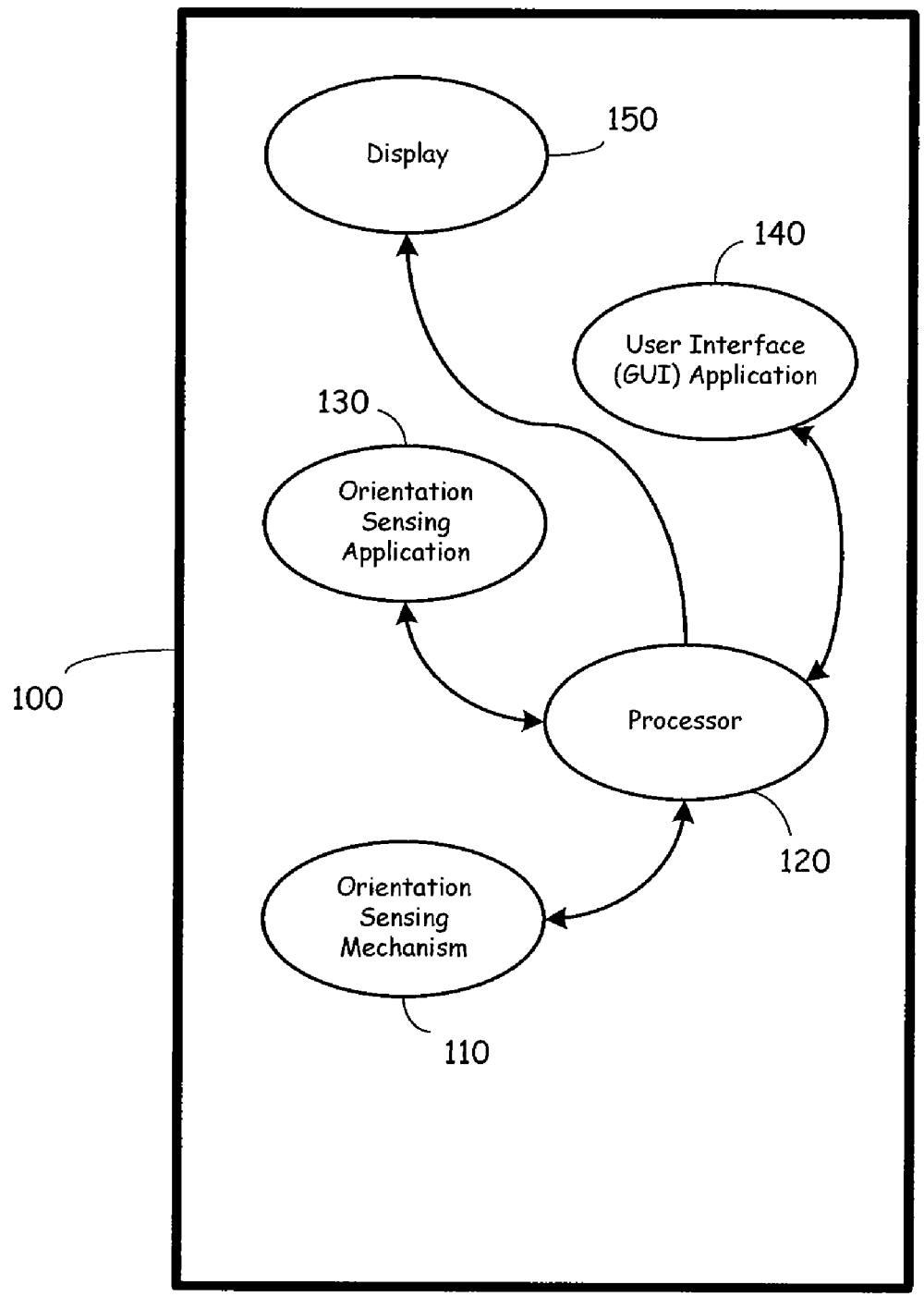
FIG. 1 is a block diagram of the internal hardware and software components within a portable mobile communications device that comprise the present invention.

FIG. 1 is a block diagram of the internal hardware and software components within a portable mobile communications device 100 that comprise the present invention. The components shown include an orientation sensing mechanism 110 such as, but not limited to, an accelerometer or a gyroscopic device. The orientation sensing mechanism 110 is coupled to a processor 120 that controls the various input and output to and from the other various components. An orientation sensing application 130, a graphical user interface (GUI) application 140, and a mechanically vibrated touchscreen display 150 are also shown. The orientation sensing mechanism 110 is configured to sense the current orientation of the portable mobile communications device 100 as a whole. The orientation data is then fed to the processor which supplies it to the orientation sensing application 130. The orientation sensing application 130, via the processor 120, controls the graphical user interface (GUI) application 140 and, in turn, the mechanically vibrated touchscreen display 150 to present the GUI for the desired mode.

FIGS. 2-7 illustrate examples of graphical user interfaces for various modes. The displays shown for each mode are exemplary. The actual layout and design of each GUI can appear differently and can be considered a design choice. In addition, while several modes have been listed, it is by no means an exhaustive list of modes. Other modes and GUIs can be implemented by those of ordinary skill in the art. The present invention is more concerned with identifying and switching among modes based on the current orientation of the portable mobile communications device.

Figure 2:
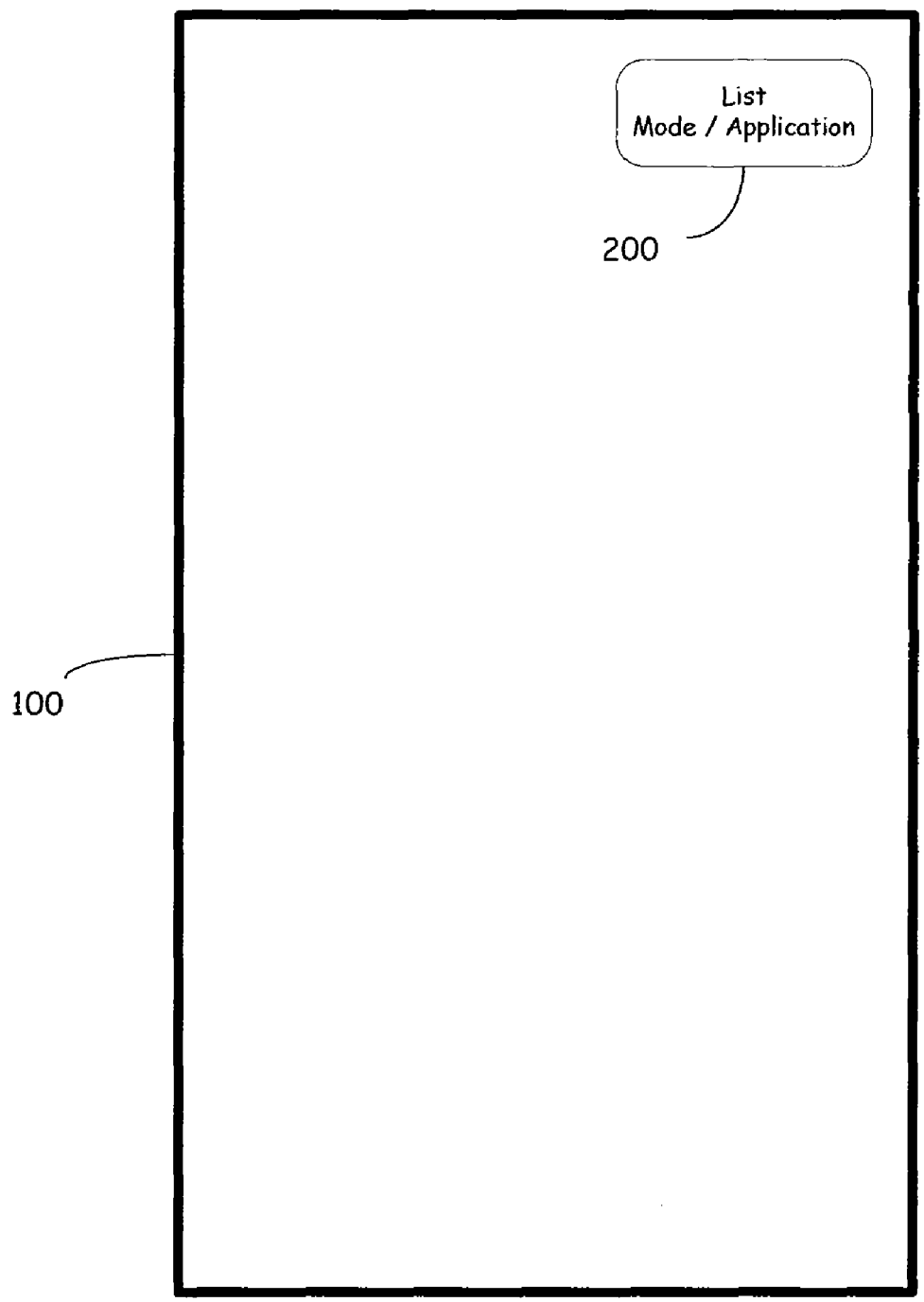
FIG. 2 illustrates a mechanically vibrated touch screen display for a portable mobile communications device showing a blank screen image.

FIG. 2 illustrates a mechanically vibrated touch screen display for a portable mobile communications device 100 showing a blank screen image. Since the portable mobile communications device 100 utilizes a mechanically vibrated touchscreen display, the buttons typically associated with the device are unnecessary and can be replaced with virtual buttons on the display itself. The mechanically vibrated touchscreen display is configurable and can provide a tactile sensation that gives the user the sensation of actually pressing a button.

In FIG. 2 the screen is shown as blank with a "List Mode/Application" icon 200 in the upper right corner. For power saving purposes this can be the default screen display. The "List Mode/Application" icon 200 allows the user to access a menu of available options for the portable mobile communications device 100 at any time.

Figure 3:
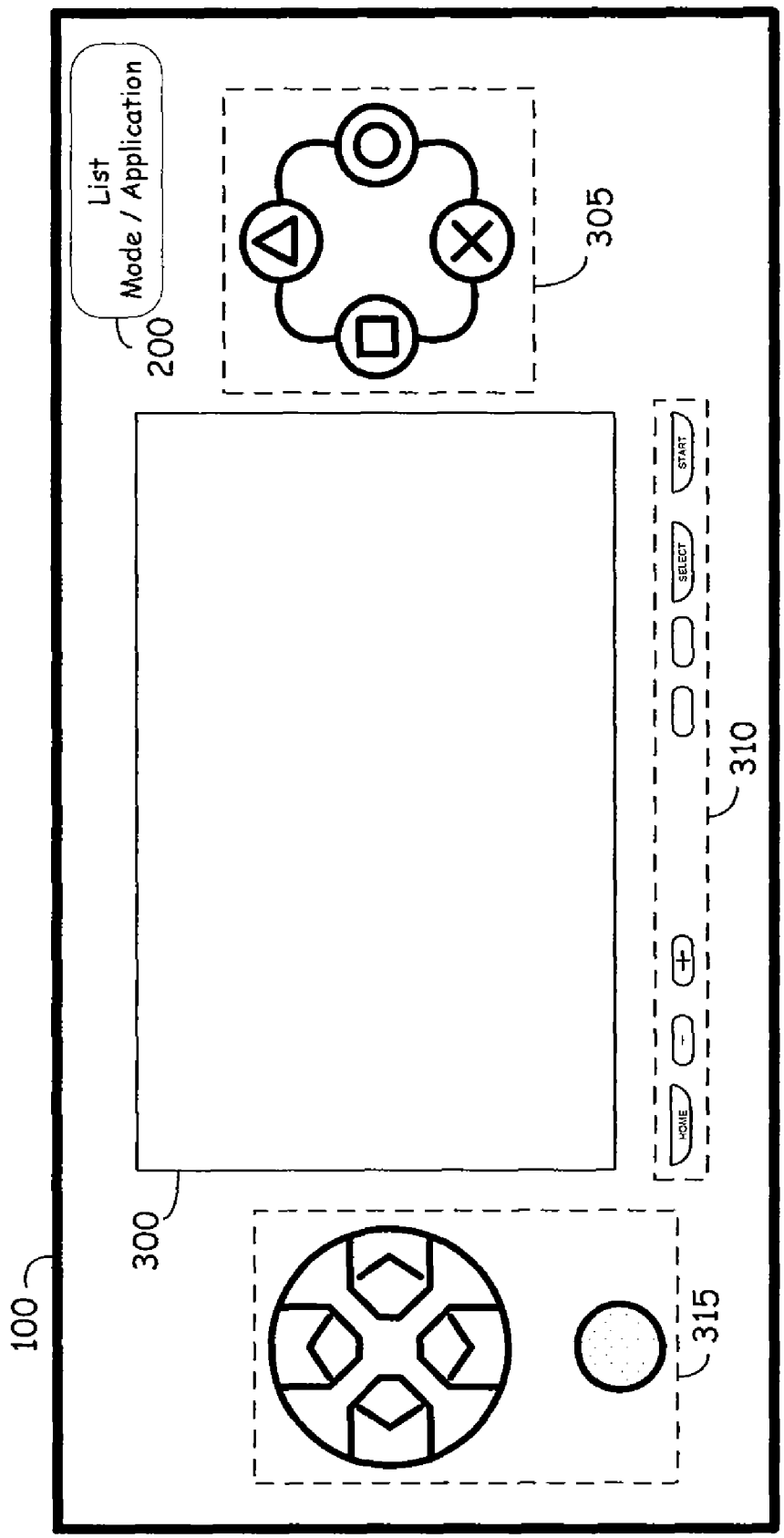
FIG. 3 illustrates a mechanically vibrated touch screen display for a portable mobile communications device 100 showing a screen image of a portable gaming system.

FIG. 3 illustrates a mechanically vibrated touch screen display for a portable mobile communications device 100 showing a screen image of a portable gaming system in landscape orientation. The "List Mode/Application" icon 200 remains in the upper right corner of the screen allowing the user to switch modes manually at any time. It should be noted that the "List Mode/Application" icon 200 could be replaced by a physical button located somewhere on the side or back of the portable mobile communications device 100. This would free even more space on the mechanically vibrated touchscreen display.

FIG. 3 is set out to mimic the look and feel of the popular Sony™ Playstation Portable (PSP™) gaming device. The area designated by reference number 300 is reserved for game action. It is essentially the display within the display. The dashed box referred to by reference number 305 represents the buttons that appear on the right hand side of the PSP™. The dashed box referred to by reference number 310 represents the buttons that appear on the bottom of the PSP™. Lastly, the dashed box referred to by reference number 315 represents the buttons that appear on the left hand side of the PSP™. The buttons represented by reference numbers 305, 310, and 315 are graphical renditions on the mechanically vibrated touchscreen display 150 of the portable mobile communications device 100. The mechanically vibrated touchscreen display is configurable and re-configurable to suit the mode or application desired by the user. In this example, when the user presses an area of the mechanically vibrated touchscreen display that corresponds to one of the buttons that is associated with the PSP™ interface, a tactile sensation is returned to the user that indicates a button was pressed. The exact type of tactile sensation emitted by the mechanically vibrated touchscreen display and experienced by the user can vary according to parameters set out in the display configuration associated with that mode. Thus, some buttons may have different feels than other buttons.

Figure 4:
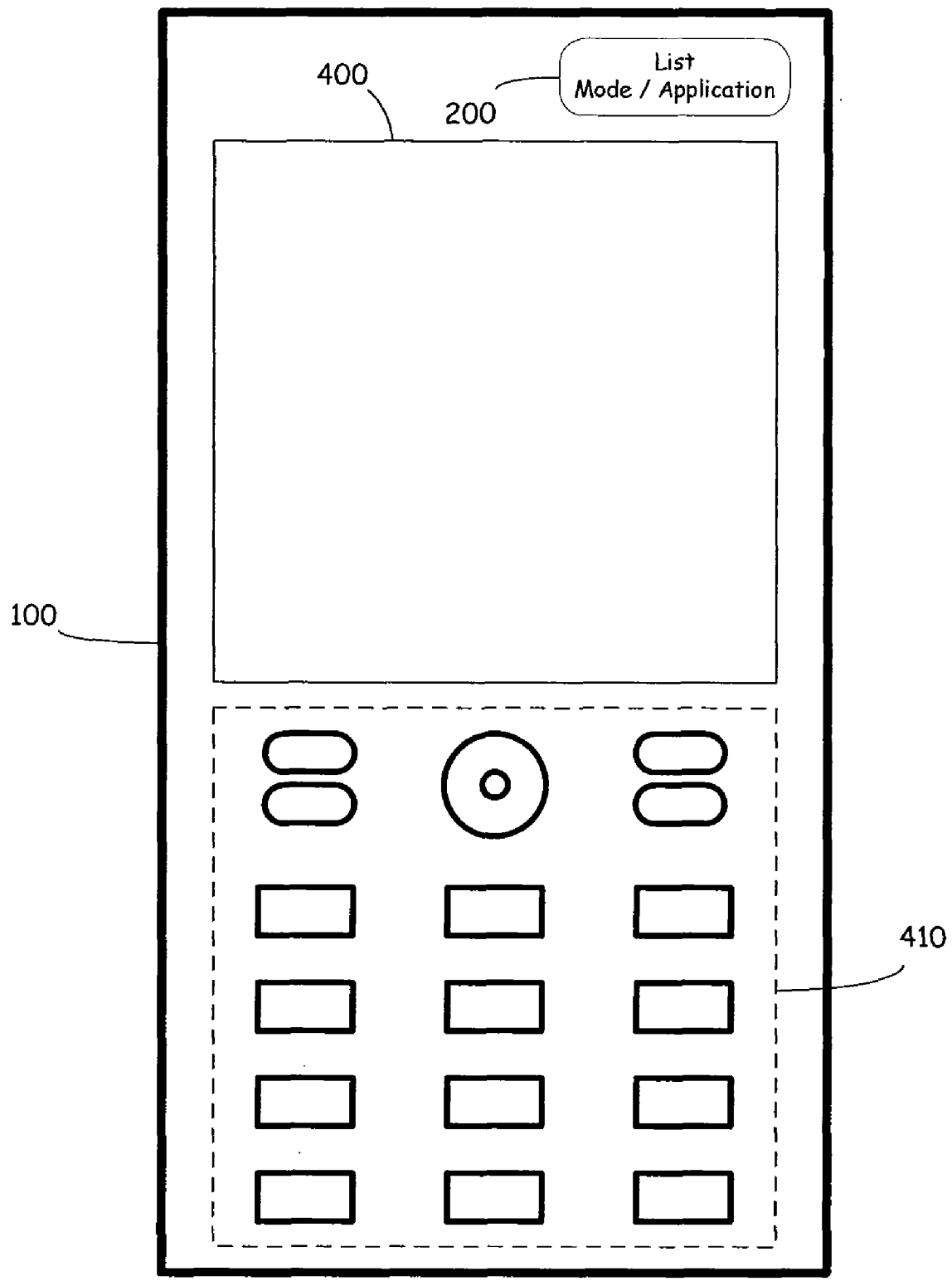
FIG. 4 illustrates a mechanically vibrated touch screen display for a portable mobile communications device showing a screen image of a phone keypad.

FIG. 4 illustrates a mechanically vibrated touch screen display for a portable mobile communications device 100 showing a screen image of a phone keypad in portrait orientation. The most commonly utilized mode for the portable mobile communications device 100 is probably the phone keypad mode. It is in this mode that the user can make and receive telephone calls. Once again the "List Mode/Application" icon 200 remains in the upper right corner of the screen allowing the user to switch modes manually at any time. The screen 400 within the screen provides visual feedback and queues to the user. The dashed box referred to by reference number 410 represents a phone keypad that allows the user to navigate through phone functions and dial phone numbers.

Figure 5:
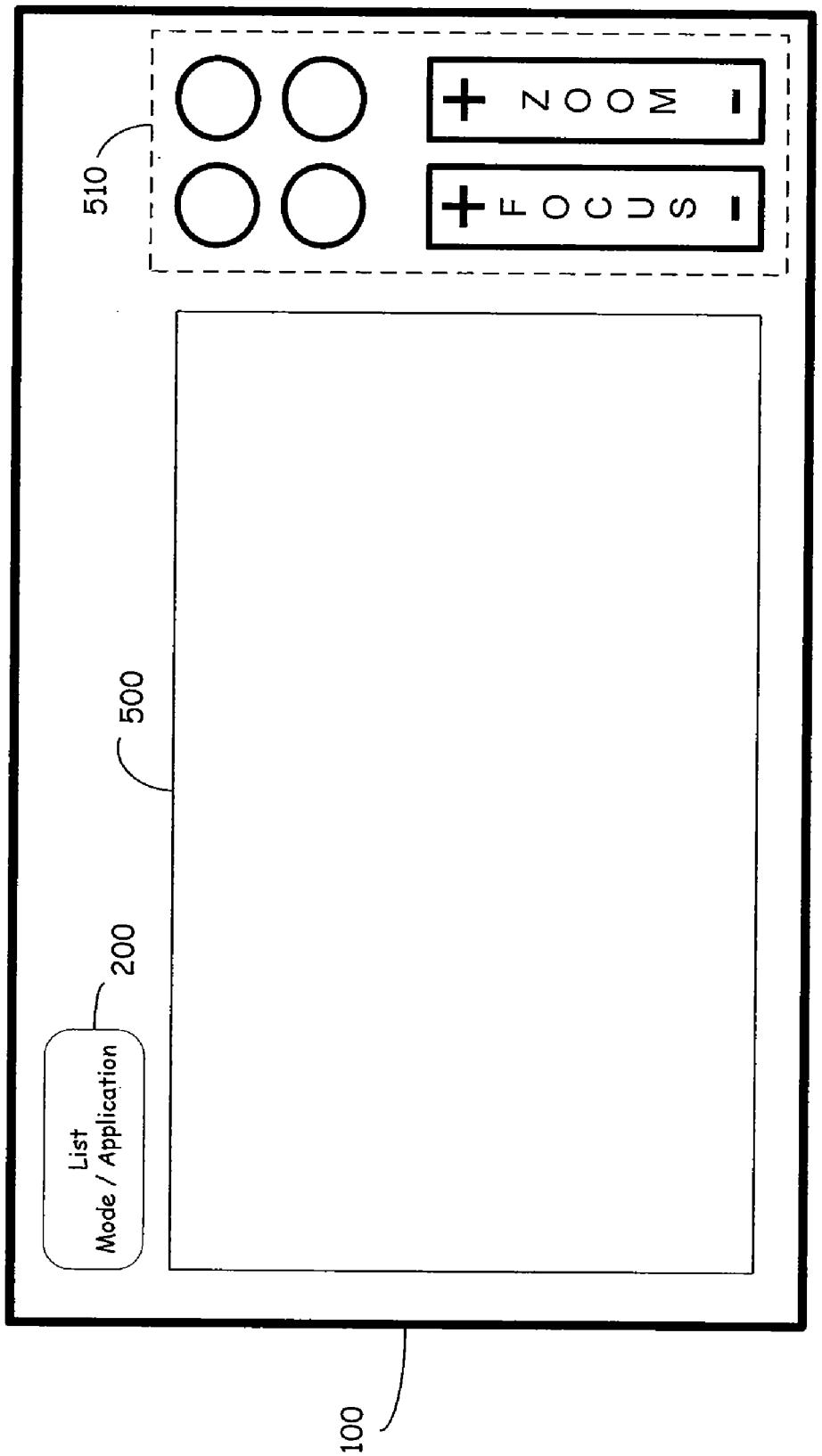
FIG. 5 illustrates a mechanically vibrated touch screen display for a portable mobile communications device showing a screen image of a digital camera.

FIG. 5 illustrates a mechanically vibrated touch screen display for a portable mobile communications device showing a screen image of a digital camera in landscape orientation. The "List Mode/Application" icon 200 remains allowing the user to switch modes manually at any time. Area 500 represents the viewfinder (and playback area) when operating in digital camera mode. The dashed box 500 refers to control functions typically associated with a camera mode such as, but not limited to, focus and zoom. Other virtual control buttons could be programmed to change lighting settings, shutter speeds, camera modes (take picture vs. display pictures), etc.

Figure 6:
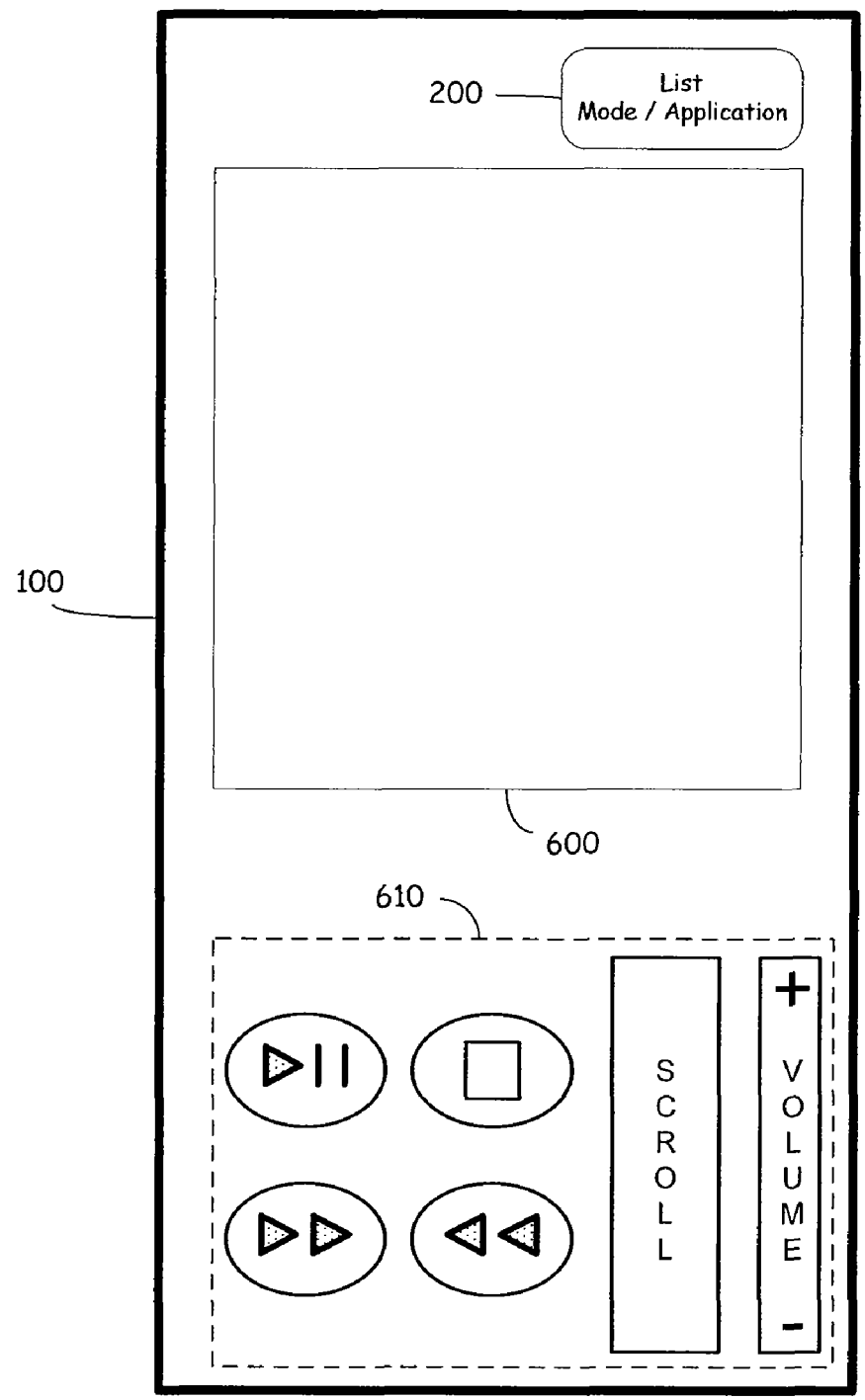
FIG. 6 illustrates a mechanically vibrated touch screen display for a portable mobile communications device showing a screen image of a digital music player.

FIG. 6 illustrates a mechanically vibrated touch screen display for a portable mobile communications device 100 showing a screen image of a digital music player in portrait orientation. The "List Mode/Application" icon 200 remains allowing the user to switch modes manually at any time. In this example the screen area 600 can display data pertaining to individual songs, playlists, etc. The dashed box 610 illustrates control keys that can change the volume, scroll through lists on the display area 600, stop, pause, fast forward, rewind, and play selected songs.

Figure 7:
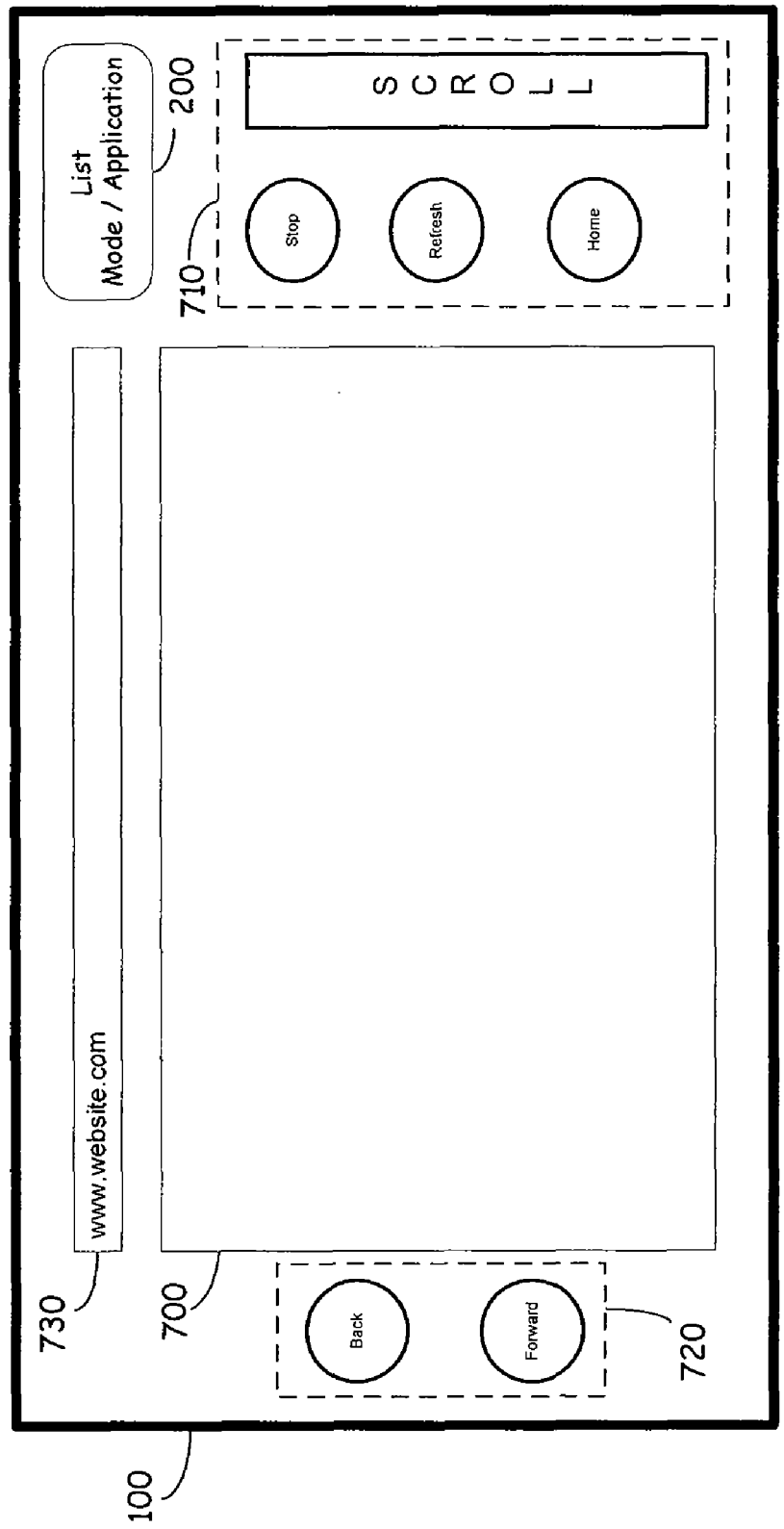
FIG. 7 illustrates a mechanically vibrated touch screen display for a portable mobile communications device showing a screen image of a web browser.

FIG. 7 illustrates a mechanically vibrated touch screen display for a portable mobile communications device showing a screen image of a web browser in landscape orientation. The "List Mode/Application" icon 200 remains allowing the user to switch modes manually at any time. In this example the screen area 700 can display web-sites from the Internet or the like. Dashed box 710 illustrates configurable control buttons that perform some of the basic web browsing navigation functions such as scrolling through a page, stopping a data transfer, refreshing a web-site, and navigating to a pre-defined home page. Box 720 illustrates additional web browsing navigation functions such as going back to the previous web page or forward to the web page that was just being viewed. Lastly, box 730 illustrates a universal resource locator (URL) address bar to let the user know what web site they are currently viewing.

Figure 8:
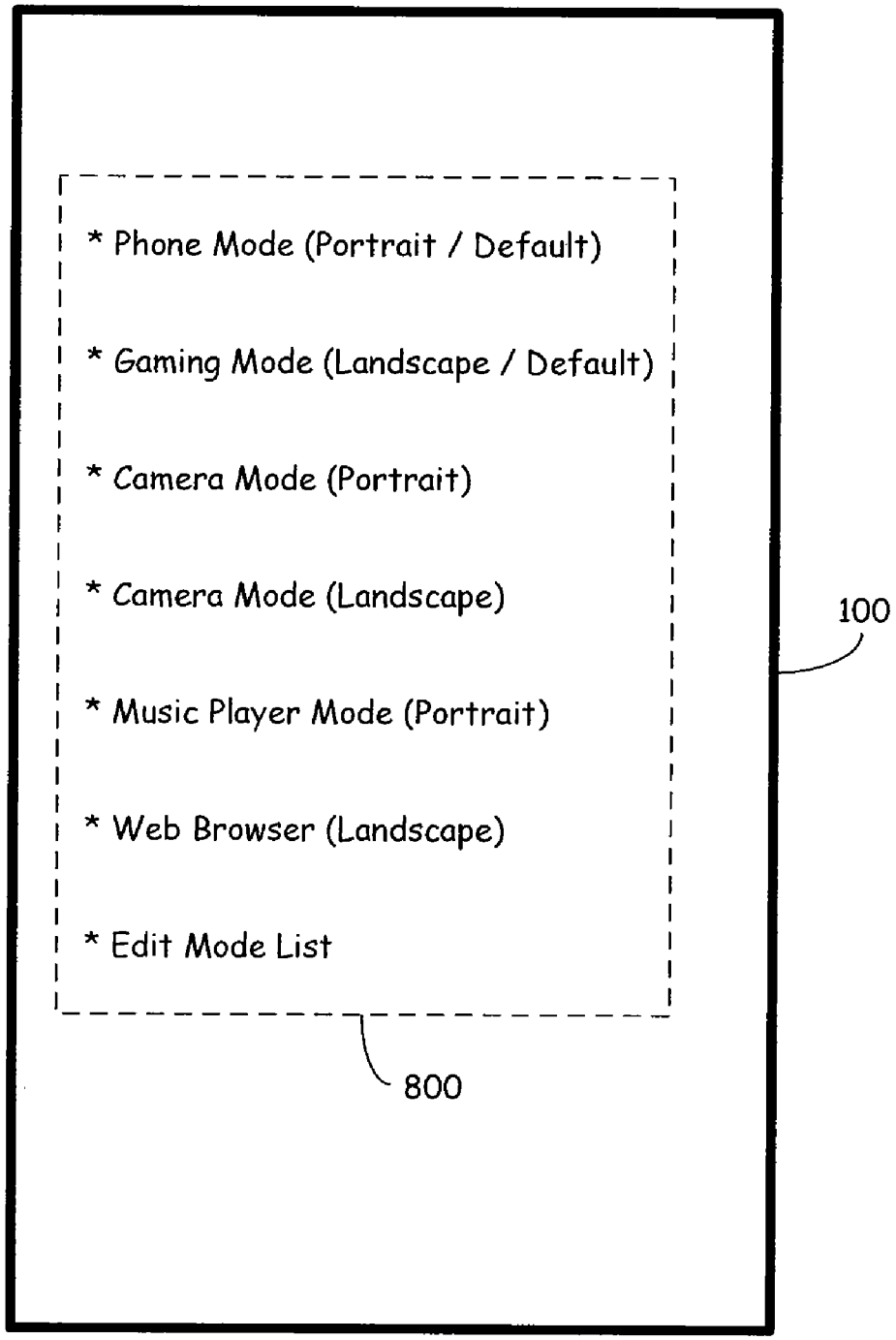
FIG. 8 illustrates a mechanically vibrated touch screen display for a portable mobile communications device showing a screen image of a list of modes that the portable mobile communications device is capable of executing.

FIG. 8 illustrates a mechanically vibrated touch screen display for a portable mobile communications device showing a screen image of a list of modes that the portable mobile communications device is capable of executing. In each of the examples in FIGS. 2-7, a "List Mode/Application" icon was included as a means for allowing the user to switch modes manually at any time. If the user were to press this area of the screen in whatever mode was currently active, an image similar to that of FIG. 8 would appear. A list of available modes would be presented to the user such that the user need only press the desired mode to cause the mechanically vibrated touch screen display to re-configure itself to the newly desired mode or application. Moreover, the list itself could be edited to change the default modes for the portrait and landscape orientations.

Figure 9:
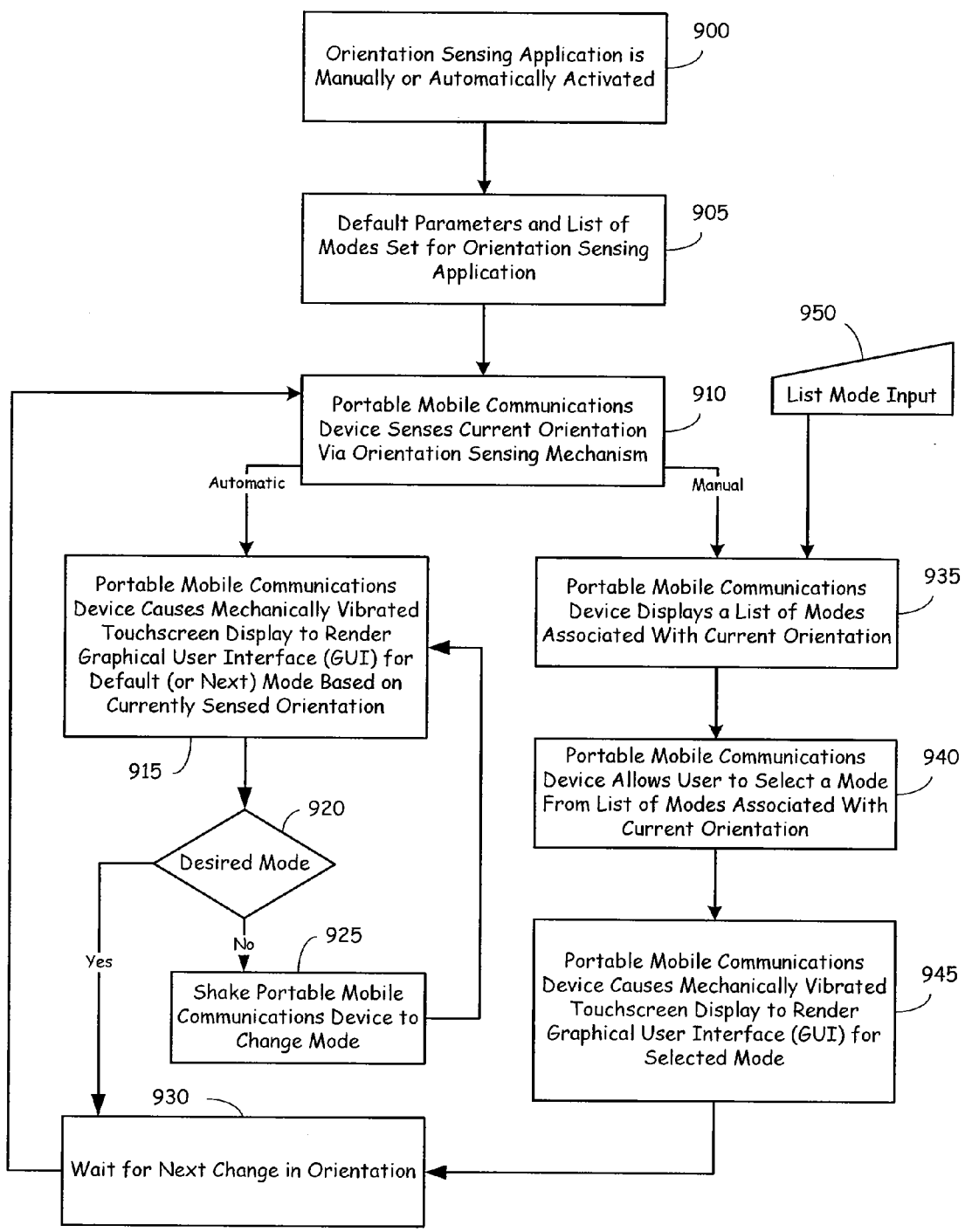
FIG. 9 is a flow chart illustrating the processes occurring within the portable mobile communications device that control the modes presented on the mechanically vibrated touch screen display.

FIG. 9 is a flow chart illustrating the processes occurring within the portable mobile communications device that control the modes presented on the mechanically vibrated touch screen display. The orientation sensing application is activated 900 either manually or automatically depending on the profile of the portable mobile communications device as a whole. The default parameters and a list of modes and/or applications is retrieved and applied to the orientation sensing application 905. Once active, the orientation sensing application receives data from the orientation sensing mechanism that indicates the current orientation of the portable mobile communications device 910.

If operating in automatic mode, the orientation sensing application causes the mechanically vibrated touch screen display to render the graphical user interface (GUI) for the default mode or application associated with the currently sensed orientation (portrait or landscape) 915. The user is visually prompted on the usable screen area for that mode or application whether this is the desired mode or application 920. If the default mode is not the desired mode, the user can shake the portable mobile communications device which will be detected by the orientation sensing mechanism and relayed to the orientation sensing application 925. For an alternative to shaking the portable mobile communications device, the user could select a preconfigured 'button' somewhere on the surface area of the portable mobile communications device. The orientation sensing application will then reconfigure the mechanically vibrated touch screen display for another mode or application associated with the currently sensed orientation 915. The user is again visually prompted on the usable screen area for that mode or application whether this is the desired mode or application 920 and the process repeats until the user is presented with the desired mode. If no negative response to the prompt is received within a specified timeframe (e.g., a couple of seconds), then the orientation sensing application assumes the current mode is the desired mode. The orientation sensing application then goes into a standby state in which it waits for the next change in orientation to be sensed 930.

If operating in manual mode, the orientation sensing application causes the mechanically vibrated touch screen display to list of modes and/or applications associated with the currently detected orientation (or all modes and/or applications regardless of orientation) from which the user can select 935. The user makes a selection from the list that is detected and processed by the orientation sensing application 940. The orientation sensing application then reconfigures the mechanically vibrated touch screen display for the selected mode or application 945. The orientation sensing application then goes into a standby state in which it waits for the next change in orientation to be sensed 930. A "List Mode Input" 950 process has been included to indicate that the user can manually access the list of modes and applications at any time.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media, such as volatile and nonvolatile memory devices, floppy and other removable disks, hard disk drives, magnetic tape, optical disks (e.g., CD-ROMs, DVDs, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of reconfiguring the graphical user interface (GUI) of a touchscreen display associated with a portable mobile communications device that is operable in a variety of modes, the reconfiguration of the GUI based on the orientation of the portable mobile communications device, the method comprising: sensing whether the portable mobile communications device is currently in a portrait or landscape orientation; accessing an orientation profile that associates each mode of operation with either a portrait or landscape orientation, wherein a first mode of operation comprises a first set of control buttons displayed on a first GUI in the portrait orientation to allow input from a user for operation of the portable mobile communications device when the portable mobile communications device is orientated in the portrait orientation, and wherein a second mode of operation comprises a second set of control buttons displayed on a second GUI in the landscape orientation to allow input from a user for operation of the portable mobile communications device when the portable mobile communications device is orientated in the landscape orientation, wherein the first set of control buttons is different than the second set of control buttons, and wherein the first set of control buttons are configured to have a orientation in landscape orientation and wherein the second set of control buttons are configured to have a orientation in a portrait orientation; determining which mode of operation is the default mode for the sensed orientation of the portable mobile communications device; reconfiguring the GUI of the touchscreen display for the default mode of operation; detecting that the user has shaken the portable communication device when the GUI of the touchscreen display is in the default mode of operation; and reconfiguring the GUI of the touchscreen display for a mode of operation other than the default mode of operation in response to the detecting that the user has shaken the portable communication device.

2. The method of claim 1 further comprising:
prompting the user if the current mode is the desired mode of operation; receiving input indicative of a response to prompting the user if the current mode is the desired mode of operation; reconfiguring the GUI of the touchscreen display for another mode of operation associated with the current orientation of the portable mobile communications device if the received input indicative of a response to prompting the user is negative;
repeating the prompting, receiving, and reconfiguring steps until the GUI on the touchscreen display for the desired mode of operation is presented.

3. The method of claim 2 wherein the modes of operation include phone mode, camera mode, game mode, music player mode, and web-browser mode.

4. A method of reconfiguring the graphical user interface (GUI) of a touchscreen display associated with a portable mobile communications device that is operable in a variety of modes, the method comprising:
sensing the current orientation of the portable mobile communications device;
accessing an orientation profile that associates each mode of operation with an orientation, wherein a first mode of operation comprises a first set of control buttons displayed on a first GUI to allow input from a user for operation of the portable mobile communications device when the portable mobile communications device is orientated in a first orientation, and wherein a second mode of operation comprises a second set of control buttons displayed on a second GUI to allow input from a user for operation of the portable mobile communications device when the portable mobile communications device is orientated in a second orientation, wherein the first set of control buttons is different than the second set of control buttons, and wherein the first set of control buttons are configured to have a orientation in landscape orientation and wherein the second set of control buttons are configured to have a orientation in a portrait orientation; presenting a list of modes of operation associated with the sensed orientation of the portable mobile communications device in response to sensing the current orientation of the portable mobile communications device; prompting the user to select a mode of operation from the list; receiving input indicative of a selected mode of operation; and reconfiguring the GUI of the touchscreen display for the selected mode of operation associated; detecting that the user has shaken the portable communication device when the GUI of the touchscreen display is in the default mode of operation; and reconfiguring the GUI of the touchscreen display for a mode of operation other than the default mode of operation in response to the detecting that the user has shaken the portable communication device.

5. The method of claim 4 wherein the modes of operation include phone mode, camera mode, game mode, music player mode, and web-browser mode.

6. A system that can reconfigure the graphical user interface (GUI) of a touchscreen display associated with a portable mobile communications device that is operable in a variety of modes, the reconfiguration of the GUI based on the orientation of the portable mobile communications device, the system comprising: orientation sensing means for sensing whether the portable mobile communications device is currently in a portrait or landscape orientation; an orientation profile for associating each mode of operation with either a portrait or landscape orientation, wherein a first mode of operation comprises a first set of control buttons displayed on a first GUI to allow input from a user for operation of the portable mobile communications device when the portable mobile communications device is orientated in the portrait orientation, and wherein a second mode of operation comprises a second set of control buttons displayed on a second GUI to allow input from a user for operation of the portable mobile communications device when the portable mobile communications device is orientated in the landscape orientation, wherein the first set of control buttons is different than the second set of control buttons, and wherein the first set of control buttons are configured to have a orientation in landscape orientation and wherein the second set of control buttons are configured to have a orientation in a portrait orientation; means for determining which mode of operation is the default mode for the sensed orientation of the portable mobile communications device based on the orientation profile; and means for reconfiguring the GUI of the touchscreen display for the default mode of operation; means for detecting that the user has shaken the portable mobile communications device when the GUI of the touchscreen display is in the default mode of operation; and means for reconfiguring the GUI of the touchscreen display for a mode of operation other than the default mode of operation in response to the detecting that the user has shaken the portable mobile communications device.

7. The system of claim 1 further comprising:
means for prompting the user if the current mode is the desired mode of operation;

means for receiving input indicative of a response to prompting the user if the current mode is the desired mode of operation;

means for reconfiguring the GUI of the touchscreen display for another mode of operation associated with the current orientation of the portable mobile communications device if the received input indicative of a response to prompting the user is negative; and means for repeating the process until the GUI on the touchscreen display for the desired mode of operation is presented.

8. The system of claim 7 wherein the modes of operation include phone mode, camera mode, game mode, music player mode, and web-browser mode.

9. The system of claim 6 wherein the orientation sensing means is an accelerometer.

10. The system of claim 6 wherein the orientation sensing means is a gyroscopic device.

11. A method of reconfiguring the graphical user interface (GUI) of a touchscreen display associated with a portable mobile communications device that is operable in a variety of modes, the reconfiguration of the GUI based on the orientation of the portable mobile communications device, the method comprising: sensing the current orientation of the portable mobile communications device; accessing an orientation profile that associates each mode of operation with an orientation, wherein a first mode of operation comprises a first set of control buttons displayed on a first GUI to allow input from a user for operation of the portable mobile communications device when the portable mobile communications device is orientated in a first orientation, and wherein a second mode of operation comprises a second set of control buttons displayed on a second GUI to allow input from a user for operation of the portable mobile communications device when the portable mobile communications device is orientated in a second orientation, wherein the first set of control buttons is different than the second set of control buttons, and wherein the first set of control buttons are configured to have a orientation in landscape orientation and wherein the second set of control buttons are configured to have a orientation in a portrait orientation; determining which mode of operation is the default mode for the sensed orientation of the portable mobile communications device; reconfiguring the GUI of the touchscreen display for the default mode of operation; detecting that the user has shaken the portable communication device when the GUI of the touchscreen display is in the default mode of operation; and reconfiguring the GUI of the touchscreen display for a mode of operation other than the default mode of operation in response to the detecting that the user has shaken the portable mobile communications device.

12. The method of claim 11 further comprising:

prompting the user if the current mode is the desired mode of operation; receiving input indicative of a response to prompting the user if the current mode is the desired mode of operation; reconfiguring the GUI of the touchscreen display for another mode of operation associated with the current orientation of the portable mobile communications device if the received input indicative of a response to prompting the user is negative;

and repeating the prompting, receiving, reconfiguring steps until the GUI on the touchscreen display for the desired mode of operation is presented.

13. A system that can reconfigure the graphical user interface (GUI) of a touchscreen display associated with a portable mobile communications device that is operable in a variety of modes, the reconfiguration of the GUI based on the orientation of the portable mobile communications device, the system comprising: orientation sensing means for sensing the orientation of a portable mobile communications device; an orientation profile for associating each mode of operation with an orientation, wherein a first mode of operation comprises a first set of control buttons displayed on a first GUI to allow input from a user for operation of the portable mobile communications device when the portable mobile communications device is orientated in a first orientation, and wherein a second mode of operation comprises a second set of control buttons displayed on a second GUI to allow input from a user for operation of the portable mobile communications device when the portable mobile communications device is orientated in a second orientation, wherein the first set of control buttons is different than the second set of control buttons, and wherein the first set of control buttons are configured to have a orientation in landscape orientation and wherein the second set of control buttons are configured to have a orientation in a portrait orientation: means for determining which mode of operation is the default mode for the sensed orientation of the portable mobile communications device based on the orientation profile; means for reconfiguring the GUI of the touchscreen display for the default mode of operation; means for detecting that the user has shaken the portable mobile communications device when the GUI of the touchscreen display is in the default mode of operation; and means for reconfiguring the GUI of the touchscreen display for a mode of operation other than the default mode of operation in response to the detecting that the user has shaken the portable communication device.

14. The system of claim 13 further comprising:

means for prompting the user if the current mode is the desired mode of operation;

means for receiving input indicative of a response to prompting the user if the current mode is the desired mode of operation;

means for reconfiguring the GUI of the touchscreen display for another mode of operation associated with the current orientation of the portable mobile communications device if the received input indicative of a response to prompting the user is negative; and means for repeating the process until the GUI on the touchscreen display for the desired mode of operation is presented.

15. The system of claim 14 wherein the modes of operation include phone mode, camera mode, game mode, music player mode, and web-browser mode.

16. The system of claim 14 wherein the orientation sensing means is an accelerometer.

17. The system of claim 14 wherein the orientation sensing means is a gyroscopic device.

18. The method of claim 1 wherein the touchscreen display comprises mechanically vibrated touchscreen display that, when a button that is displayed on the GUI is selected by the user, issues a tactile sensation to the user to indicate that the button was selected.

19. The method of claim 1 further comprising presenting an area on the touchscreen that, when depressed, presents a list of modes of operations to allow the user to manually select a desired mode of operation.

* * * * *